Sept. 8, 1931.  A. R. THOMPSON  1,822,180
FRUIT PITTING MACHINE
Filed Oct. 4, 1927   3 Sheets-Sheet 1

Inventor
Albert R. Thompson
By Lyon & Lyon
Attorneys

Sept. 8, 1931.    A. R. THOMPSON    1,822,180
FRUIT PITTING MACHINE
Filed Oct. 4, 1927    3 Sheets-Sheet 2

Inventor
Albert R. Thompson
Lyon & Lyon
Attorneys

Sept. 8, 1931.  A. R. THOMPSON  1,822,180
FRUIT PITTING MACHINE
Filed Oct. 4, 1927   3 Sheets-Sheet 3

Inventor
Albert R. Thompson
By Lyon&Lyon
Attorneys

Patented Sept. 8, 1931

1,822,180

UNITED STATES PATENT OFFICE

ALBERT R. THOMPSON, OF SAN JOSE, CALIFORNIA, ASSIGNOR TO PACIFIC MACHINERY COMPANY, OF SAN FRANCISCO, CALIFORNIA, A CORPORATION OF CALIFORNIA

FRUIT PITTING MACHINE

Application filed October 4, 1927. Serial No. 223,898.

This invention relates to fruit pitting machines, and is more particularly directed to a machine for cutting from the flesh of the fruit the pit of the fruit and for halving the fruit.

In the pitting of fruit, particularly clingstone peaches, it is essential that the pitting machine be capable of extremely rapid operation in order that the machine may be commercially applicable in competition to the hand pitting methods which have heretofore been practiced. In fruit, particularly clingstone peaches, the pit is surrounded by a discolored portion of the fruit known in peaches as "red center" and in order to successfully pit such fruit it is essential that all of this "red center" be removed without removing too large a portion of the flesh of the fruit which requires the pitting member to follow closely the curvature of the pit, particularly passing close to the fins of the pit.

In my copending application filed October 30, 1926, Serial No. 145,160, I have disclosed a means for shifting the pit of the fruit relative to a curved pitting knife in order to cause the pitting knife to pass closely around the pit of the fruit. The pit is shifted by two opposed movable members which move during the actuation of the curved pitting knife to maintain the pitting knife substantially in contact with the pit of the fruit. In my copending application Serial No. 98,077, filed March 29, 1926, I have disclosed a means for pitting fruit to cause the pitting knife to follow closely around the pit of the fruit to which machine means are provided for moving the pitting knife during the rotation of the same to cause the pitting knife to follow closely the curvature of the pit which is held stationary.

In accordance with the invention involved in this present application, the fruit is impaled upon an impaling member to halve the flesh of the fruit. The pitting machine is then actuated to bring a holding member into position to hold the fruit on the impaling member. A movable member is then actuated by the pitting machine to move the pit of the fruit toward the curved pitting knife until the pit engages the curved pitting knife. The pitting knife is then rotated and the pitting knife during the severing of the flesh of the fruit from the pit causes the pit to shift with it until the pit engages a limit stop means which holds the pit from further movement relative to the pitting knife which is caused to travel in an eccentric path around the pit of the fruit and which pitting knife passes between the limit stop means and the pit closely around the fin of the pit, causing the pit to be cut from the flesh of the fruit while removing a minimum of the flesh of the fruit but also while removing all of the red center which surrounds the pit without leaving any of the pit or projections from the pit in the halves of the fruit formed.

An object of this invention is, therefore, to provide a fruit pitter including means for halving the flesh of the fruit, a curved pitting knife positioned in the halving means, and means for shifting the fruit pit toward the curved pitting knife in one position, and means for arresting the movement of the pit in the opposed direction.

Another object of this invention is to provide an apparatus for removing the pits from fruit which includes a pitting knife which is adapted to be rotated around the pit of the fruit, means for rotating the pitting knife, and means adapted to control the movement of the pitting knife in one direction, and means adapted to control the movement of the pitting knife in a transverse direction.

Another object of this invention is to provide a fruit pitter including a curved knife, the axis of which is adapted to move in a given plane, the pitting knife having supporting means at its ends adapted to permit the knife to move in said given plane, and means for holding the ends of the knife from movement in a transverse plane.

Another object of this invention is to provide a fruit pitter including an impaling means within which a curved pitting knife is positioned, the curved pitting knife having oppositely extending shanks extending through open slots formed in the impaling blade and which shanks are supported at their ends in a manner to permit the pitting knife and shanks thereof to flex freely in the impaling blade should the said knife engage and "hang up" on the pit of the fruit so that when the said curved pitting knife engages the pit of the fruit, the same will flex and pass around the same without breaking the pitting knife.

Another object of this invention is to provide a fruit pitter including an impaling blade, means for supporting the fruit on the impaling blade, and means operatively connected with the supporting means and being spring-urged into the supporting position, and means for locking the supporting means in an inoperable position.

Another object of this invention is to provide a fruit pitter including means for halving the flesh of the fruit, means for severing the pit from the flesh of the fruit including means for effecting relative movement of the pit and pitting means during the operation of the pitting means to cause the pitting means to pass closely around the pit of the fruit, and means adapted to actuate the pitting means in a cyclic operation so as to bring the pitting means to rest at a given point in the pitting means after each pitting operation.

Other objects and advantages of this invention, it is believed, will be apparent from the following detailed description of a preferred embodiment thereof as illustrated in the accompanying drawings.

Figure 1:
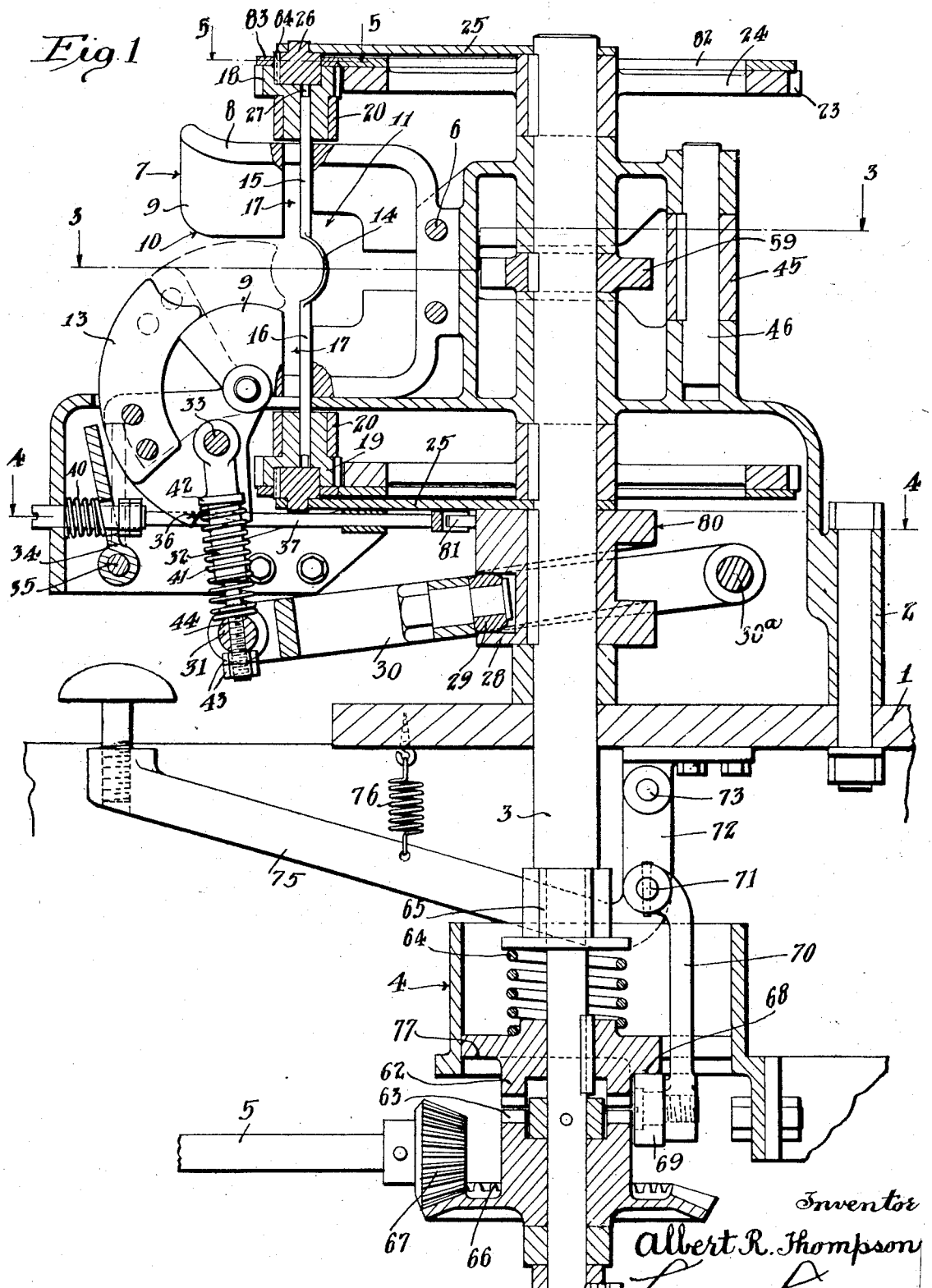
Figure 1 is a central sectional elevation of a fruit pitter embodying this invention.
Figure 2:
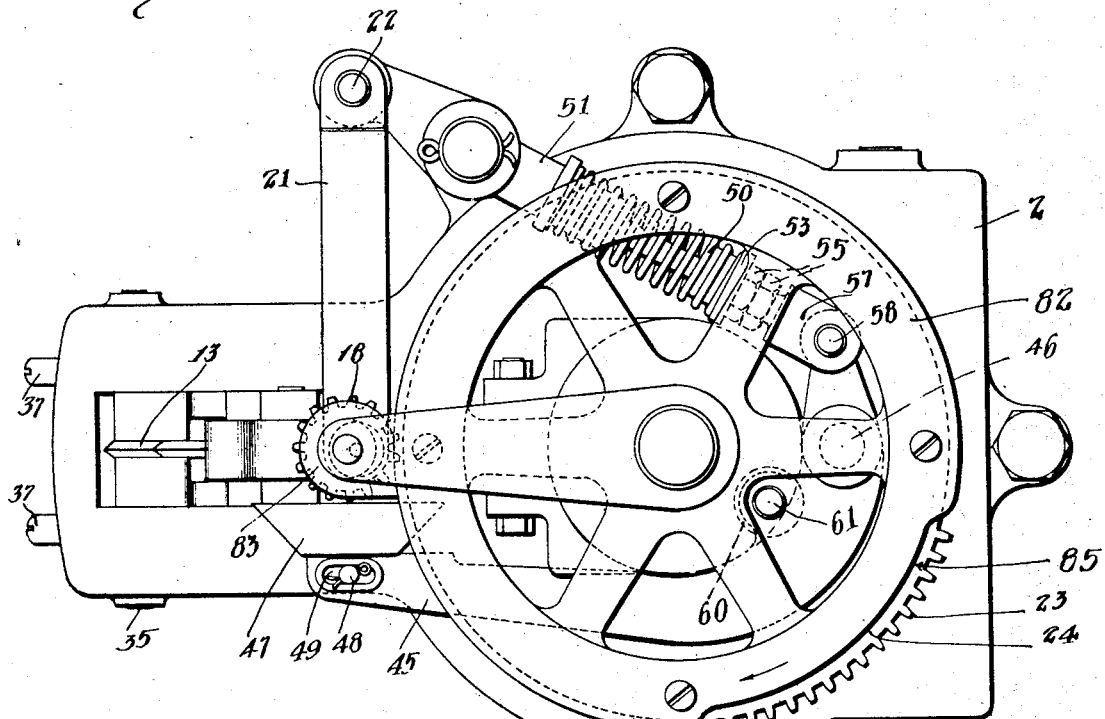
Figure 2 is a top plan view thereof.
Figure 3:
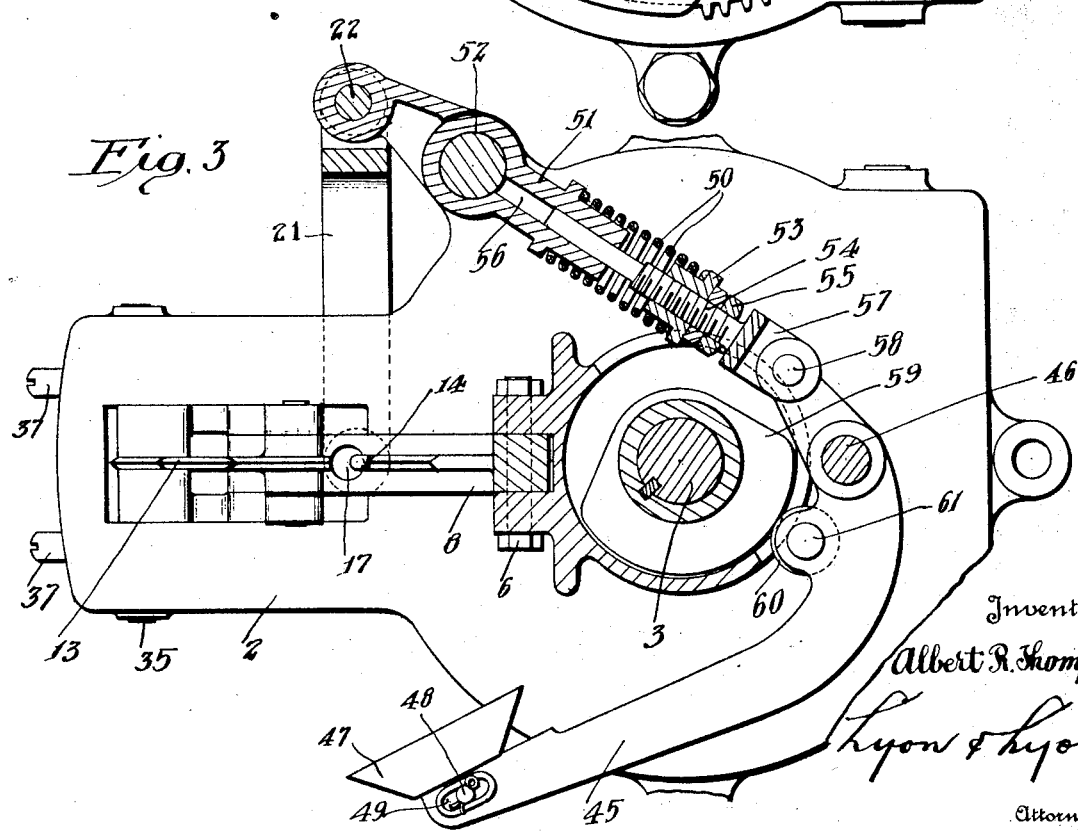
Figure 3 is a sectional plan view taken substantially on the line 3—3 of Figure 1.
Figure 4:
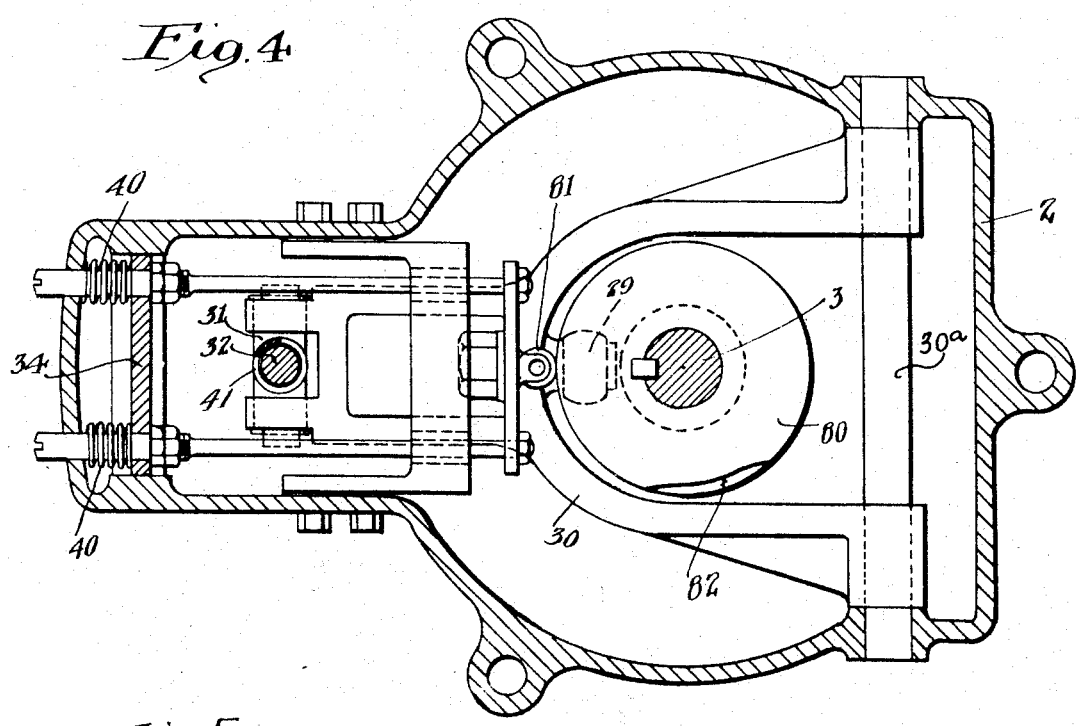
Figure 4 is a sectional plan view taken substantially on the line 4—4 of Figure 1.
Figure 5:
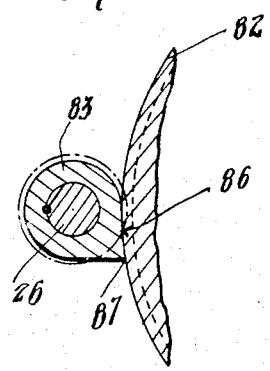
Figure 5 is a sectional view taken substantially on the line 5—5 of Figure 1, illustrating the rotation lock means.

Referring to the drawings, 1 indicates a table top upon which the frame 2 of the pitting machine is supported. Rotatably supported in the frame 2 is an operating shaft 3 which is operable connected to a make and break clutch 4 with a power driven shaft 5 driven from any suitable or desirable source of power. Secured to the frame 2, as illustrated at 6, is an impaling blade 7.

The impaling blade 7 includes a rim 8 and a pair of spaced blades 9 having sharpened knife blade edges 10 forming a pit slot which terminates in a pit receiving recess 11. Pivotally supported on the frame 2 at the point 12 is a shifting member 13 of the impaling blade 7, which forms means for shifting the pit of the fruit in one direction in the pit receiving recess 11 of the impaling blade 7, and also forms limit stop means for arresting the movement of the pit of the fruit in the opposed direction in the pit receiving recess 11 and is of a construction and mode of operation that will hereinafter be specifically set forth.

Means are provided for severing the pit from the fruit and for causing the said severing means to pass closely around the pit of the fruit, which means are preferably of the following construction:

A curved pitting knife 14 having a shallow curvature adapted to pass around the pit of the fruit from end to end thereof is provided. The curved pitting knife 14 forms a shallow cut in the flesh of the fruit and the pitting knife is curved to conform substantially to the curvature of the pit around the shortest of the maximum dimensions or the thickness of the pit. In this manner, the curved pitting knife will form in the flesh of the fruit a cut of shallow depth. The curved pitting knife is thus formed, in view of the known fact that the thickness of a pit, particularly of clingstone peaches, is the only fairly constant dimension of such pits irrespective of the width or length thereof. In order that the curved pitting knife 14 may be caused to pass around the pit of the fruit and follow the curvature thereof closely, irrespective of the width of the pit, the curved pitting knife is caused to move substantially in the plane of the cut formed in the flesh of the fruit by the impaling blade 7, that is, the axis of the curved pitting knife is moved during the rotation of the curved pitting knife in order that the curved pitting knife will follow closely the curvature of the pit but will pass around the laterally projecting fins which project outwardly from the pit, particularly of clingstone peaches. In order to shift the axis of the curved pitting knife 14 and to rotate the curved pitting knife 14 around the pit of the fruit, the following means are provided. The curved pitting knife 14 has two oppositely extending shanks 15 and 16 which extend through open slots 17 formed in the impaling blade 7 and rim 8 thereof. The shanks 15 and 16 are releasably secured at their ends to eccentric pinions 18 and 19 which are journaled in bearing members 20 formed at the end of a pivotally mounted yoke 21, pivotally supported at a pivot 22 from the frame 2. The yoke 21 permits the axis of the curved pitting knife 14 to move as the eccentric pinions 18 and 19 are rotated substantially in the plane of the impaling blade 7 but operates to prevent movement of the axis of the curved pitting knife in a transverse direction.

Means are provided for holding the pinions 18 and 19 in position to mesh with the teeth 23 formed on the periphery of the gear wheel 24, which means preferably comprise links 25 which are journaled on the shaft 3, and are releasably secured at their opposite ends to cylindrical blocks 26 which fit within cylindrical cut-outs formed in the upper ends of the pinions 18 and 19, respectively. The cylindrical blocks 26 also act to hold the pinions 18 and 19 in position so that the flat ends 27 of the shanks 15 and 16 of the curved pitting knife 14 are releasably held within the slotted portions of the pinions 18 and 19 whereby the curved pitting knife 14 is driven by the pinions 18 and 19.

It often happens during the severing of the pit from the fruit that the pitting knife 14, which is necessarily of a fragile construction, hangs up on the projecting portions of the pit of the fruit and even though the pitting knife 14 is permitted to freely flex, breaks making necessary the removal of the pitting knife 14 or it may be necessary to remove the pitting knife 14 to provide a new and sharp pitting knife. As speed of operation is particularly essential in the construction of such a fruit pitter in order that the same may successfully compete with the prior hand methods of pitting, it is necessary that the pitting knife 14 be removably held so as to permit the same to be removed and replaced with a new knife in a minimum of time. The construction heretofore described of holding the pitting knife 14 in driving relation with the pinions 18 and 19 permits a very rapid removal of the pitting knife 14 as it is only necessary to spring the upper link 25 off from the cylindrical block 26, pick the cylindrical block 26 from the cut-out formed in the upper pinion 18, remove the pinion 18, and draw the pitting knife 14 from the slots 17 formed in the impaling blade 7 and replace a new knife so that the flattened end thereof fits within the slotted portion of the lower pinion 19, and then replace the pinion 18, block 26, and upper link 25 in position.

In order to drive the pinions 18 and 19, the gear wheels 24 are provided which have formed on their peripheries the gear teeth 23 which mesh with the pinions 18 and 19. The gear wheels 24 are secured to the operating shaft 3.

Means are provided for moving the shifting portion 13 of the impaling blade 7 into position to move the pit of the fruit toward the pitting knife 15 when the pitting knife 14 lies in the position illustrated in Figure 1 and for arresting the movement of the fruit pit in the opposed direction, which means are preferably of the following construction:

Mounted on the operating shaft 3 is a cam 28 within which a cam roller 29 rolls. The cam roller 29 is pivotally mounted upon a pin secured to the link 30. The link 30 is pivotally secured at a pin 31 at its opposite end to an adjustable link 32. The link 30 is fulcrumed on the pin 30a. The link 32 is pivotally secured at its opposed end at the pin 33 to the web of the shifting portion 13 of the impaling blade 7. The limit stop means are provided for arresting the movement of the shifting portion 13 of the impaling blade 7 to provide stop means for stopping the movement of the fruit pit in a direction opposed to that to which the shifting portion 13 actuates said pit, which means preferably comprise an arm 34 which is pivotally secured to the frame 1 at pin 35 and engages a shoulder 36 formed on the shifting portion 13 of the impaling blade 7 in timed relation as determined by the cam 80. Passing through the arm 34 and adjustably secured thereto is an operating rod 37. A spring 40 is mounted on the rod 37 between the frame 2 and arm 34, tending to yieldably urge the arm 34 into position to engage the shoulder 36. Carried by the rod 37 is a cam roller 81 which rides on the cam 80 and normally acts to hold the arm 34 in position away from the shoulder 36. The arm 34 is moved to engage the shoulder 36 by the spring 40 when the roller 81 rides into the depression 82 formed on the surface of the cam 80 which is the time when the pitting knife 14 is just about to pass around the pit of the fruit at the front of the recess 11 as distinguished from the back thereof, the position in which the knife 11 is illustrated as occupying in Figure 1.

The adjustable link 32 is provided so as to permit an adjustment of the limit stop position of the impaling blade portion 13 and is also provided with means which normally urge the impaling blade portion 13 toward the slot 11 formed in the impaling blade 7, and which means preferably comprise a compression spring 41 mounted on the arm 32 in position to engage a collar 42 at one end and the pivot pin 31 at the opposed end. The arm 32 is adjustable in length by means of the nuts 43 screw-threaded to the arm 32, as indicated at 44. The arm 32 is adjusted to a position so that the moving portion 13 of the impaling blade 7 will move the fruit pit just to a point of engagement with the curved pitting knife 14 when the same is in the position indicated in Figure 1. The shoulder 36 is provided in a position so that when the shifting portion 13 of the impaling blade 7 is moved in the opposed direction, the same will stop in a position to form the pit receiving recess 1 of the impaling blade 7 to a width of substantially the largest pit.

Means are provided for holding the fruit on the impaling blade during the operation of the pitting machine, which means are preferably of the following construction:

An arm 45 is pivotally secured at a pin 46 to the frame 2 and is provided at its end with a fruit holding cup 47 which is slidably mounted at a pin 48 within an elongated slot 49 formed in the end of the arm 45 so as to permit the holding cup 47 to move as the fruit and pit are moved on the impaling blade 7 by the shifting portion 13 of the impaling blade 7 and in an opposed direction by the operation of the pitting knife 14. Means are provided for yieldably urging the cup 47 to the holding position, which means preferably comprise a compression spring 50 which is mounted upon an arm 51 pivotally mounted on the frame 2, as indicated at 52. The spring 50 is mounted at its opposed end upon a collar 53. The collar 53 is held adjustably in position by means of a rod 54 which is screw-threaded through the collar 53 and is locked in adjusted position by means of lock nuts 55. The rod 54 passes into a bore 56 formed in the member 51. The rod 54 is formed integral with a yoke 57 which is pivotally secured at a pin 58 to the end of the arm 45.

Means are provided for moving the holding cup 47 against the tendency of the spring 50 from engaging position, which means preferably comprise a cam member 59 which is secured to the operating shaft 3 and engages a cam roller 60 pivotally mounted at the pin 61 on the arm 45.

The make and break clutch 4 may be of any suitable or desirable construction and is herein illustrated as comprising a gear 62 which is slidably mounted on the operating shaft 3 and is yieldably urged downward into position to mesh with the gear 63 by means of a spring 64 interposed between the gear 62 and a collar 65. The gear 63 is formed integral with a spur gear 66, which meshes with a spur pinion 67 mounted on the operating shaft 5. Formed on the gear 62 is a cam 68 on which a cam roller 69 is adapted to ride. The cam roller 69 is mounted at the end of a lever 70 which is pivotally secured at 71 to a link 72. The link 72 is pivotally secured to the pin 73 to a bracket secured to the table top 1 and is secured at its opposite end at the pin 74 to an operating lever 75. A spring 76 is interposed between the operating lever 75 and table top 1 in order to normally hold the cam roller 69 in position to ride on the cam 68. When the operating lever 75 is depressed, the cam roller 69 is moved away from the cam 68 so that the spring 64 causes the gear 62 to engage with the gear 63 to drive the shaft 3. As the operating lever 75 is released, the cam roller 69 is yieldably urged into position to engage the cam 68 on the low portion 77 thereof so that on rotation of the cam 68, the cam roller 69 causes the gear 62 to be moved away from the meshing position with the gear 63.

The cup 47 may be moved and locked in an inoperative position by rotating the arm 45 into position to move the pivot point formed by the pin 58 across the line of centers through the pin 46 and pivot point of the member 51 so that the spring 50 urges the cup 47 away from the supporting position. This locking of the holding cup 47 out of operative position is an important feature in that it enables the operator of the machine to operate the machine and remove any fruit that may become stuck on the impaling blade and may be mutilated thereon by imperfect operation of the machine without the holding cup 47 interfering.

Means are provided for stopping the rotation of the pitting knife 14 when the same has rotated through a complete revolution and for holding the pitting knife in the pit receiving recess 11 at the back thereof to enable the fruit to be impaled on the impaling blade 7, which means preferably include a lock wheel 82 which is secured to the wheel 24 by any suitable or desirable means. A lock washer 83 is secured to the block 26 by means of the key 84. The lock wheel 82 is cut out at 85 over the teeth 23. The lock washer 83 has an arcuate face 86 presenting a shoulder 87 which engages the periphery of the wheel 82 holding the pinion 18 from rotating until said shoulder 87 passes into the cut-out 85 at which time the pinion meshes with the teeth 23 to rotate the pitting knife through exactly 360° before the lock washer 83 engages its shoulder 87 again on the periphery of the wheel 82 at the end of the teeth 23.

The operation of the fruit pitter embodying this invention is:

The fruit is impaled upon the impaling blade 7 so that the fruit pit passes through the slot formed between the blades 9 and 10 and the fruit is then rotated through 90° completing the severing of the flesh of the fruit and positioning the pit lengthwise in the pit receiving recess 11. The operator then depresses the lever 75 causing the make and break clutch 4 to engage to rotate the shaft 3. The cam 59 then passes off of the cam roller 60 permitting the holding cup 47 to be urged by the spring 50 to position to hold the fruit on the impaling blade 7. The rotation of the cam 28 causes the shifting portion 13 of the impaling blade 7 to be moved to urge the pit of the fruit to engage the pitting knife 14, the pitting knife 14 still being in the position indicated in Figure 1. Further rotation of the shaft 3 causes the pitting knife 14 to rotate and the rotation of the pitting knife 14 moves the fruit and pit longitudinally of the impaling blade 7 and the fruit and pit are stopped from further movement by the shifting portion 13 of the impaling blade 7 being held in the limit stop position by the arm 34 engaging the shoulder 36. The pitting knife 14 passes between the end of the shifting portion 13 of the impaling blade 7 and as the same is caused to travel in an elongated path by the movement of its axis longitudinally of the impaling blade 7 by the eccentric pinions 18 and 19, a shallow cut is formed around the pit of the fruit close to the same removing all of the red center from the fruit while removing a minimum of the flesh of the fruit. As the curved pitting knife continues its revolution, the cam roller 69 elevates the gears 62 from engagement with the gear 63, stopping the rotation of the shaft 3.

Having fully described my invention, it is to be understood that I do not wish to be limited to the details herein set forth, but my invention is of the full scope of the appended claims.

I claim:

1. In a fruit pitter, the combination of means for halving the flesh of the fruit, a curved pitting knife, means for rotating the knife, means for shifting the pit of the fruit toward the curved knife in one position, and means for arresting the movement of the pit in the opposite direction.

2. In a fruit pitter, the combination of an impaling means for halving the flesh of the fruit, a curved pitting knife positioned in said means, means for rotating the curved pitting knife, and means for shifting the pit of the fruit toward the knife in one position and operable to arrest the movement of the pit in the opposite direction.

3. A fruit pitting apparatus including a blade, a curved knife, means for rotating the knife, means to move the knife axes in a plane parallel with the blade during the rotation of the knife, and abutments in the plane of the blade against which the pit contacts to cause the knife to pass closely around the fin of the pit.

4. A device of the class described, including an impaling blade having a pit receiving recess, a curved pitting knife mounted in said recess, means for moving the pit of the fruit toward the knife in one position in the recess, means for rotating the knife, and means adapted to close the pit receiving recess so that the width of said recess is substantially the width of a large pit.

5. In a pitter, the combination of an impaling blade, a curved pitting knife, means for rotating the curved pitting knife, means for moving the pit toward the pitting knife in one position, the pit being free to move with the pitting knife in the opposite direction, and limit stop means for terminating the latter said movement of said pit.

6. In an apparatus for halving and pitting fruit, means to pit the fruit, and means to arrest the movement of the pit in opposite directions during the operation of the pitting means.

7. In an apparatus for removing pits from fruit, means to cleave the flesh of the fruit and leave the pit intact, a curved knife to cut the pit from the fruit, means to move the knife axis in the plane of the blade to cause the pitting means to encompass the larger pits, and limit stop means to arrest the movements of the pit to cause the pitting means to cut closely to the fins of all size pits.

8. In an apparatus of the class described having a pitting knife and means to support said knife consisting of a yoke member adapted to control the movement of the knife in one direction, and a link member adapted to control movement of the knife in the transverse direction.

9. In a peach pitter having a curved pitting knife, the axis of which is adapted to move in a given plane, means for supporting the ends of the knife to permit movement in said given plane, and means for holding the ends of the knife from movement in a transverse plane.

10. In a fruit pitter, the combination of an impaling blade, a curved pitting knife, means for rotating the pitting knife, means for holding the fruit during the pitting operation, the latter said means including a holding element, means for yieldably urging the holding element toward the impaling blade, and timing means for holding said element away from said impaling blade during the impaling operation.

11. A fruit pitter having an impaling blade and means to support a fruit on said blade, said supporting means being spring urged into operable position and urged into open position by the action of a cam.

12. In a fruit pitter having an impaling blade and means to support a fruit on said blade, said supporting means being spring urged into operable position, and means to lock said support into inoperable position.

13. A device of the class described including an impaling blade, means for supporting a fruit on said blade, said supporting means being yieldably urged into supporting position, timed operating means for moving the fruit supporting means to the nonsupporting position, and said supporting means including a cup and means for supporting the cup to permit the same to move freely longitudinally of the impaling blade.

14. In a device of the class described, the combination of an impaling blade having a pit receiving recess, a curved pitting knife mounted in said recess, the pitting knife having an operating shaft, the impaling blade having an open slot elongated in the plane of the blade, and means for rotating said knife and moving said shaft longitudinally in said slot.

15. A fruit pitter having an impaling blade, means to support a fruit on said blade, means for yieldably urging the holding means toward the blade, means operable to move the holding means toward the cam, and means for locking the holding means into inoperable position.

16. A device of the class described, including means for halving the flesh of the fruit, a curved pitting knife positioned in said means, means for rotating the knife, means for shifting the pit of the fruit toward the curved pitting knife in one position, means for shifting the axis of the curved pitting knife during the rotaton of the same, and means for arresting the movement of the pit in the opposite direction to which the pit is shifted by said shifting means.

17. In a fruit pitter, the combination of a curved pitting knife, means for supporting the fruit, means for rotating the curved pitting knife, and means for shifting the pit of the fruit toward the curved pitting knife in one position and operable to arrest the movement of the pit in the opposed direction.

18. In a device of the class described, the combination of means for supporting a fruit, a curved pitting knife, means for rotating the curved pitting knife, means for shifting the pit of the fruit toward the knife in one position and operable to arrest the movement of the pit in the opposed direction, and means for shifting the axis of the curved pitting knife during the actuation of the same.

19. A device of the class described, including a frame, a shaft journaled in the frame, an impaling member secured to the frame, a curved pitting knife positioned in said impaling member, a shifting portion of the impaling blade, means on the shaft for shifting the said portion, and means secured to the shaft for rotating the curved pitting knife.

20. In a device of the class described, the combination of means for halving the flesh of a fruit, a curved pitting knife positioned in said means, means for rotating the knife, means for shifting the pit of the fruit toward the curved knife in one position, means for arresting the movement of the pit in the opposed direction, and means for driving the knife rotating and shifting means including a make and break clutch.

Signed at San Jose, Calif., this 26th day of September, 1927.

ALBERT R. THOMPSON.